United States Patent
Shen et al.

(10) Patent No.: US 8,320,475 B2
(45) Date of Patent: Nov. 27, 2012

(54) INTER-CARRIER INTERFERENCE MEASUREMENT IN ORTHOGONAL FREQUENCY DIVISION MULTIPLEXING SYSTEMS

(75) Inventors: Danxun Shen, Beijing (CN); Hong Wei Kong, Beijing (CN); Xu Zhao, Beijing (CN)

(73) Assignee: Agilent Technologies, Inc., Santa Clara, CA (US)

( * ) Notice: Subject to any disclaimer, the term of this patent is extended or adjusted under 35 U.S.C. 154(b) by 690 days.

(21) Appl. No.: 12/060,765

(22) Filed: Apr. 1, 2008

(65) Prior Publication Data

US 2009/0003425 A1    Jan. 1, 2009

(30) Foreign Application Priority Data

Jun. 29, 2007    (CN) .......................... 2007 1 0126051

(51) Int. Cl.
*H04K 1/10* (2006.01)

(52) U.S. Cl. ........ 375/260; 375/144; 375/148; 375/227; 375/231; 375/232; 375/262; 375/267; 375/295; 375/346

(58) Field of Classification Search .................. 375/260, 375/144, 148, 227, 231, 232, 262, 267, 295, 375/346; 370/208, 209, 210
See application file for complete search history.

(56) References Cited

U.S. PATENT DOCUMENTS 7,433,419 B2 * 10/2008 Yun et al. ...................... 375/296
7,548,522 B2 *  6/2009 Jwa ............................... 370/330

OTHER PUBLICATIONS

Hsiao-Chun Wu and Yiyan Wu, "A new ICI Matrices Estimation Scheme Using Hadamard Sequence for OFDM Systems," IEEE transactions on broadcasting, vol. 51, No. 3, Sep. 2005.*
Chinese Office Action date Apr. 5, 2012.

* cited by examiner

*Primary Examiner* — Dhaval Patel (57) ABSTRACT

A system for measuring inter-carrier interference (ICI) in an OFDM system includes a test symbol generator coupled to a transmitter of the OFDM system to generate an N*N orthogonal matrix having N*N test symbols, and to send the test symbols in a test symbol stream via the transmitter to a receiver of the OFDM system. The N*N test symbols are arranged by the test symbol generator into an N*N orthogonal matrix before being sent to the receiver. The system also includes an ICI measuring module coupled to the receiver to detect the N*N test symbols received in the receiver and to arrange the test symbols as a receiving matrix in the same way as the orthogonal matrix in the transmitter. The ICI measuring module outputs the receiving matrix as an ICI matrix of the OFDM system, wherein an element on the kth row, lth column of the ICI matrix represents interference from the lth sub-carrier on the kth sub-carrier, wherein $k \neq l$.

6 Claims, 8 Drawing Sheets

$$I = \begin{bmatrix} x_{11} & x_{12} & \cdots & x_{1(N-1)} & x_{1N} \\ x_{21} & x_{22} & \cdots & x_{2(N-1)} & x_{2N} \\ \cdots & \cdots & \ddots & \cdots & \cdots \\ x_{(N-1)1} & x_{(N-1)2} & \cdots & x_{(N-1)(N-1)} & x_{(N-1)N} \\ x_{N1} & x_{N2} & \cdots & x_{N(N-1)} & x_{N} \end{bmatrix} = \begin{bmatrix} 1 & 0 & \cdots & 0 & 0 \\ 0 & 1 & \cdots & 0 & 0 \\ \vdots & \vdots & \ddots & \vdots & \vdots \\ 0 & 0 & \cdots & 1 & 0 \\ 0 & 0 & \cdots & 0 & 1 \end{bmatrix}$$

$$H = \begin{bmatrix} x_{11} & x_{12} & \cdots & x_{1(N-1)} & x_{1N} \\ x_{21} & x_{22} & \cdots & x_{2(N-1)} & x_{2N} \\ \cdots & \cdots & \ddots & \cdots & \cdots \\ x_{(N-1)1} & x_{(N-1)2} & \cdots & x_{(N-1)(N-1)} & x_{(N-1)N} \\ x_{N1} & x_{N2} & \cdots & x_{N(N-1)} & x_N \end{bmatrix} = \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

INTER-CARRIER INTERFERENCE MEASUREMENT IN ORTHOGONAL FREQUENCY DIVISION MULTIPLEXING SYSTEMS

TECHNICAL FIELD

The technical field of the present invention relates to high rate wireless communications, and more specifically to inter-carrier interference measurement in Orthogonal Frequency Division Multiplexing (OFDM) systems.

BACKGROUND

An OFDM system can be employed in high rate wireless telecommunication systems. In a transmitter of the OFDM system, a data stream having a high transmission rate is divided into various data streams, each having a relatively low transmission rate. The data streams are simultaneously transmitted in parallel using a plurality of orthogonal sub-carriers. The data streams are then recombined to obtain the original data stream in a receiver of the OFDM system.

Figure 1:
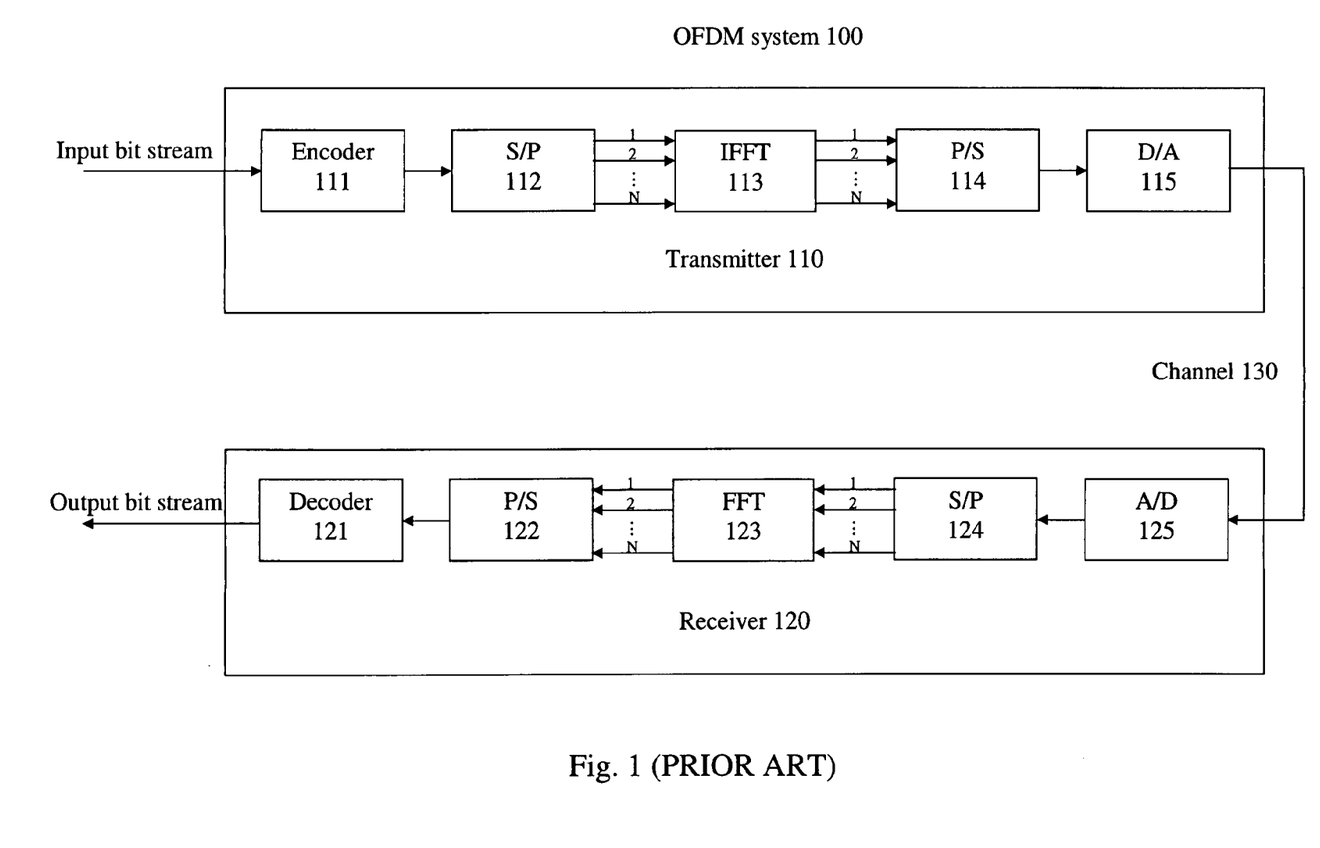
FIG. 1 is a block diagram depicting a prior art OFDM system.

FIG. 1 illustrates a discrete-time baseband equivalent model of a typical OFDM system 100, which includes a transmitter 110, a receiver 120, and a channel 130. The transmitter 110 includes an encoder 111, a serial-to parallel (S/P) converter 112, an inverse fast Fourier transform (IFFT) module 113, a parallel-to-serial (P/S) converter 114, and a digital-to-analog (D/A) converter 115. The receiver 120 includes a decoder 121, a P/S converter 122, a fast Fourier transform (FFT) module 123, an S/P converter 124, and an A/D converter 125.

In the transmitter 110, the encoder 111 first encodes an input bit stream into a symbol stream, using, for example, M-QAM (Multiple-level Quadrature Amplitude Modulation) modulation. The symbol stream is then converted into N parallel symbol streams in the S/P converter 112 (N is a number of points of IFFT as well as a total number of sub-carriers to be used in the OFDM system), wherein the kth symbol stream is to be transmitted on the kth sub-carrier. Then the N parallel symbol streams are sent to the IFFT module 113 for IFFT modulation. The output of the IFFT module 113 is serialized at the P/S converter 114. The output of the P/S converter 114 is converted into analog signals at the D/A converter 115 before the signals are sent to the receiver 120.

In the receiver 120, the received analog signals are first converted to digital signals at the A/D converter 125. Then the digital signals are converted to parallel signals at the S/P converter 124 and supplied to the FFT module 123 for demodulation. Symbol streams obtained by demodulation are serialized at the P/S converter 122 to obtain a symbol stream corresponding to the symbol stream output from the encoder 111. Then the symbol stream output from the P/S converter 122 is decoded at the decoder 121 to obtain an output bit stream corresponding to the input bit stream.

In such an OFDM system, any imperfection at the transmitter and receiver will cause performance degradation because such imperfection will destroy the orthogonality of the sub-carrier waveforms. Without the orthogonality, when the arriving signals are carried down to the baseband at the receiver, Inter-Carrier Interference (ICI) occurs. ICI refers to signal interference from one sub-carrier to others, mostly to neighboring sub-carriers.

In an OFDM transmitter, many factors such as, oscillator inaccuracies, noise, clock jitter etc. cause the imperfection. In such situations, the orthogonality of the sub-carriers at the transmitter no longer exists. The transmitter is also sensitive to RF section design choices, circuit board layout and implementation, and component variations and changes. Any imperfection or inaccuracies in those aspects will cause the orthogonality to be lost at the transmitter. The situation is further complicated by the different modulation types and frequency bands that the OFDM system may employ. Since ICI is one of the critical factors that affect the performance of the OFDM system, measurement of ICI becomes an important aspect for assessing the performance of the OFDM system.

SUMMARY

A system for measuring inter-carrier interference (ICI) in an OFDM system includes a test symbol generator coupled to a transmitter of the OFDM system to generate an N*N orthogonal matrix having N*N test symbols, and to send the N*N test symbols in a test symbol stream via the transmitter to a receiver of the OFDM system. The system also includes an ICI measuring module coupled to the receiver to detect the N*N test symbols received in the receiver and to arrange the test symbols as a receiving matrix in the same way as the orthogonal matrix in the transmitter. The ICI measuring module outputs the receiving matrix as an ICI matrix of the OFDM system, wherein an element on the kth row, lth column of the ICI matrix represents interference from the lth sub-carrier on the kth sub-carrier, wherein k≠l.

BRIEF DESCRIPTION OF THE DRAWINGS

In the accompanying drawings, like reference symbols refer to like elements.

FIG. 7 depicts a test frame having test symbols arranged in matrix and employed by the ICI measuring system of FIG. 6 to measure the ICI within the OFDM system of FIG. 6;

DETAILED DESCRIPTION

The embodiments of the present invention are described hereinafter with reference to the accompanying drawings.

Figure 2:
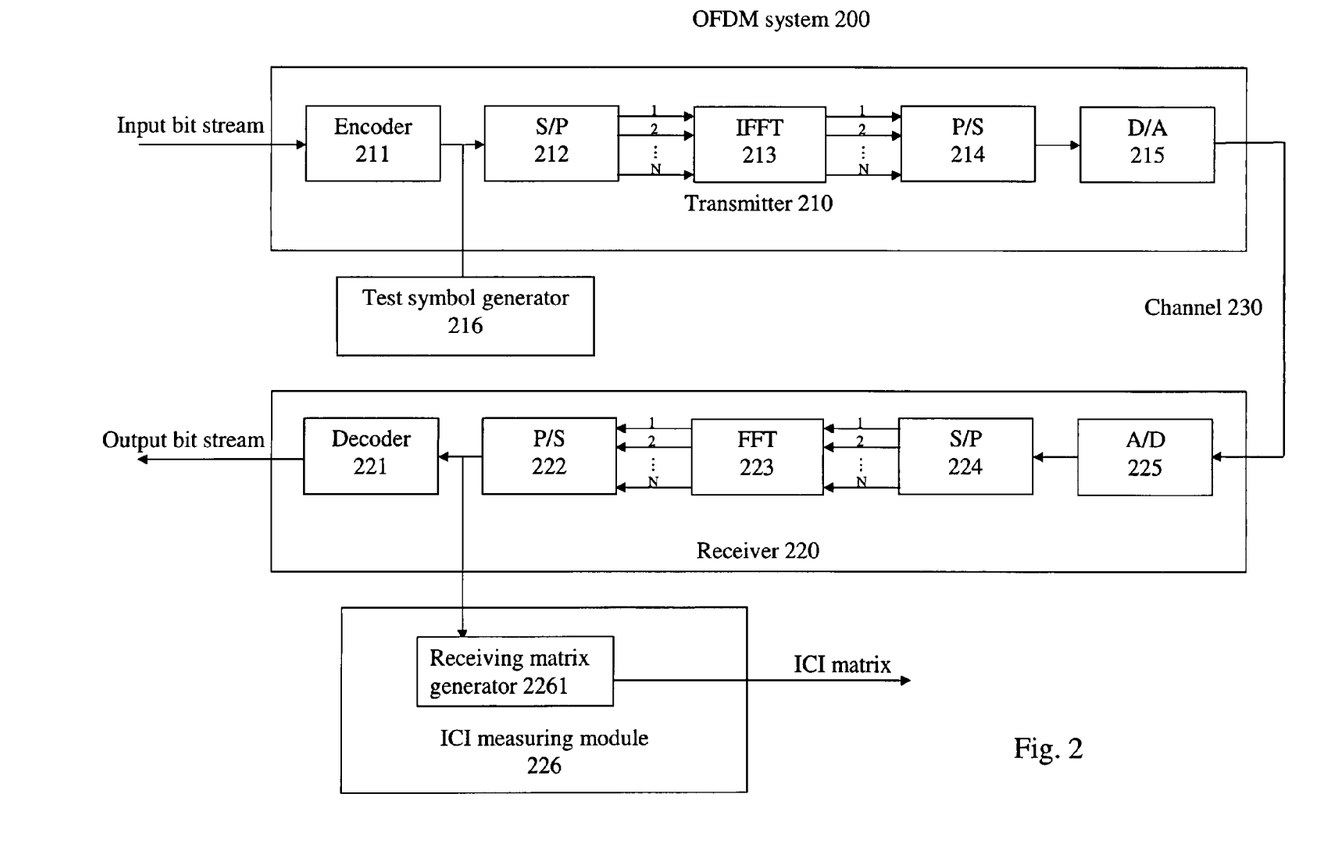
FIG. 2 is a block diagram depicting an OFDM system containing an Inter-Carrier Interference (ICI) measuring system to measure ICI within the OFDM system in accordance with an embodiment of the present invention, wherein the ICI measuring system includes a test symbol generator 216 and an ICI measuring module 226 that further includes a receiving matrix generator 2261.

FIG. 2 shows a block diagram of an OFDM system 200. The OFDM system 200 includes a transmitter 210, a receiver 220, and a channel 230. The transmitter 210 includes an encoder 211, an S/P converter 212, an IFFT module 213, a P/S converter 214, and a D/A converter 215. The receiver 220 includes a decoder 221, a P/S converter 222, an FFT module 223, an S/P converter 224, and an A/D converter 225. The structures and functions of these components and/or modules 211-215 and 221-225 can be implemented using known technologies, and thus will not be described in more detail below.

In addition, the OFDM system 200 also includes an ICI measuring system in accordance with one embodiment of the present invention. The ICI measuring system is employed to make the ICI measurement of the OFDM system 200. As can be seen from FIG. 2, the ICI measuring system includes a test symbol generator 216 and an ICI measuring module 226. The ICI measuring module 226 includes a receiving matrix generator 2261. The test symbol generator 216 is connected to the input of the S/P converter 212. The ICI measuring module 226 is connected with the output of the P/S converter 222.

Briefly, the ICI measuring system in accordance with one embodiment of the present invention measures the ICI of the OFDM system 200 by generating an orthogonally-arranged test symbol matrix that is sent from the transmitter 210 of the OFDM system 200 to the receiver 220. The received test symbols in the receiver 220 are then analyzed to obtain the ICI information of the OFDM system 200. In addition, verification can be made between theoretical results caused by carrier frequency offset and test results obtained employing the ICI measuring system in accordance with one embodiment of the present invention.

Specifically, the test symbol generator 216 generates an N*N orthogonal matrix having N*N test symbols, and sends the N*N test symbols in a test symbol stream through the OFDM system 200 (i.e., from the transmitter 210 to the receiver 220), causing the ICI information of the OFDM system 200 to be embedded in the test symbol stream. In one embodiment, the orthogonal matrix is an identity matrix. In other embodiments, the orthogonal matrix can be other types of matrixes (e.g., Hadamard matrix). The ICI measuring module 226 then receives the test symbols and rearranges them into the same matrix so as to get the ICI information of the OFDM system 200. This operation is described in more detail below. The test symbol generator 216, the ICI measuring module 226, and the receiving matrix generator 2261 may be implemented in hardware, software or any of their combinations.

Figure 3:
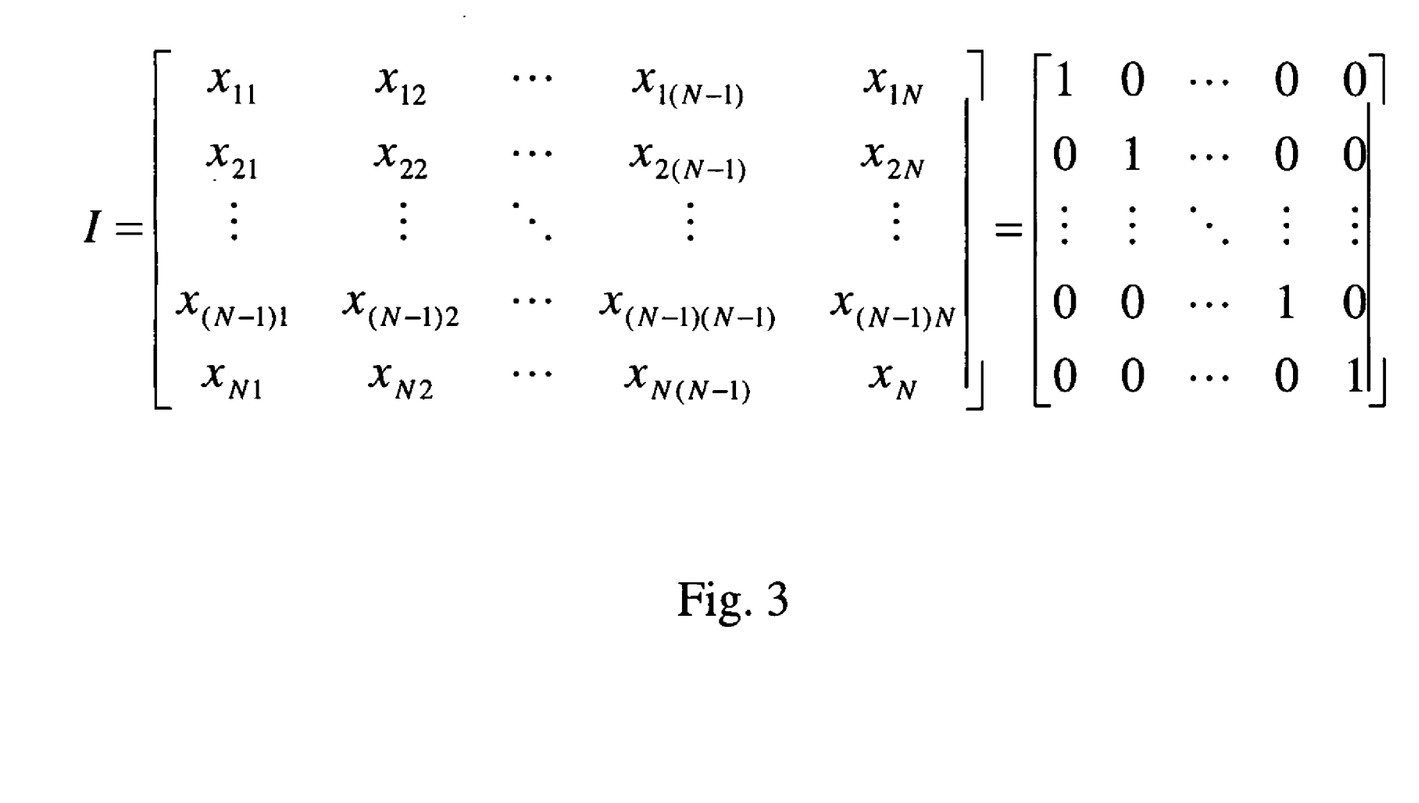
FIG. 3 depicts a test frame having test symbols arranged in matrix and employed by the ICI measuring system of FIG. 2 to measure the ICI within the OFDM system of FIG. 2.

During ICI measurement, the S/P converter 212 receives the test symbol stream from the test symbol generator 216 instead of the symbol stream from the encoder 211. In one embodiment, the test symbol stream includes N*N test symbols that constitutes an N*N orthogonal matrix generated by the test symbol generator 216. FIG. 3 depicts the test symbol stream generated by the test symbol generator 216, which will be described in more detail below. Then the test symbol stream is transmitted from the transmitter 210 to the receiver 220.

The ICI measuring module 226 is connected to the output of the P/S converter 222. The module 226 includes the receiving matrix generator 2261 to receive the output symbol stream from the P/S converter 222 and arranges the output symbols as a receiving matrix in the same way as the above-identified orthogonal matrix. The ICI measuring module 226 outputs the receiving matrix as an ICI matrix of the OFDM system 200, wherein an element on the kth row, lth column of the ICI matrix represents interference from the lth sub-carrier on the kth sub-carrier, wherein k≠l. This will be described in more detail below, also in connection with FIGS. 3-5.

As can be seen from FIG. 3, the test symbol stream generated by the generator 216 of FIG. 2 includes N*N symbols $\{x_{11}, x_{21}, \ldots, x_{N1}, x_{12}, x_{22}, \ldots, x_{N2}, \ldots, x_{1N}, x_{2N}, \ldots, x_{NN}\}$, which can constitute an identity matrix I (herein referred to as a test frame).

Figure 4:
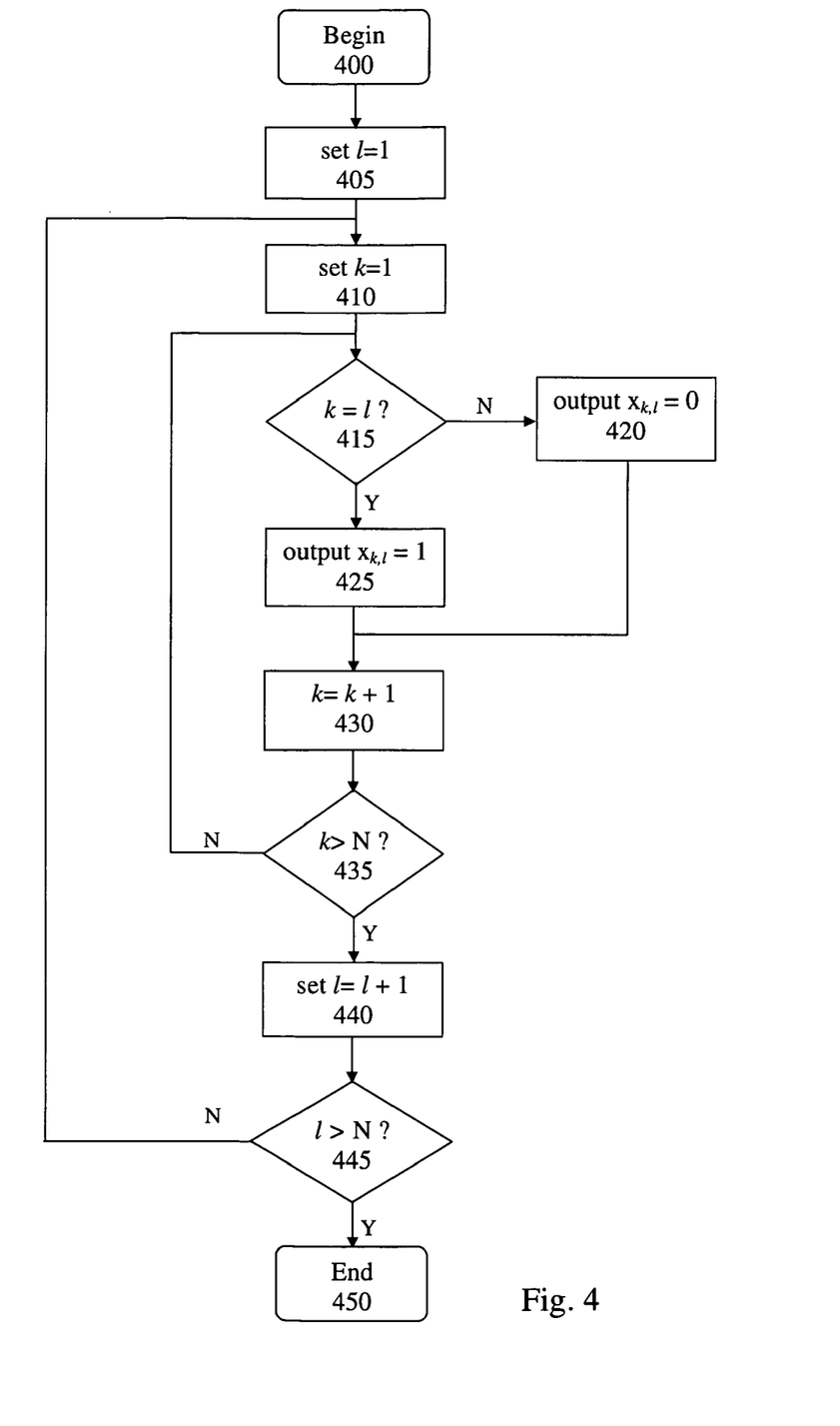
FIG. 4 is a flow diagram of the test symbol generator 216 of FIG. 2 in generating the test frame of FIG. 3.

FIG. 4 depicts the flow used by the test symbol generator 216 to generate the test symbol stream. It should be noted that the flow of FIG. 4 is merely for illustration purposes. Other known flows may be used to generate such a test symbol stream.

Figure 5:
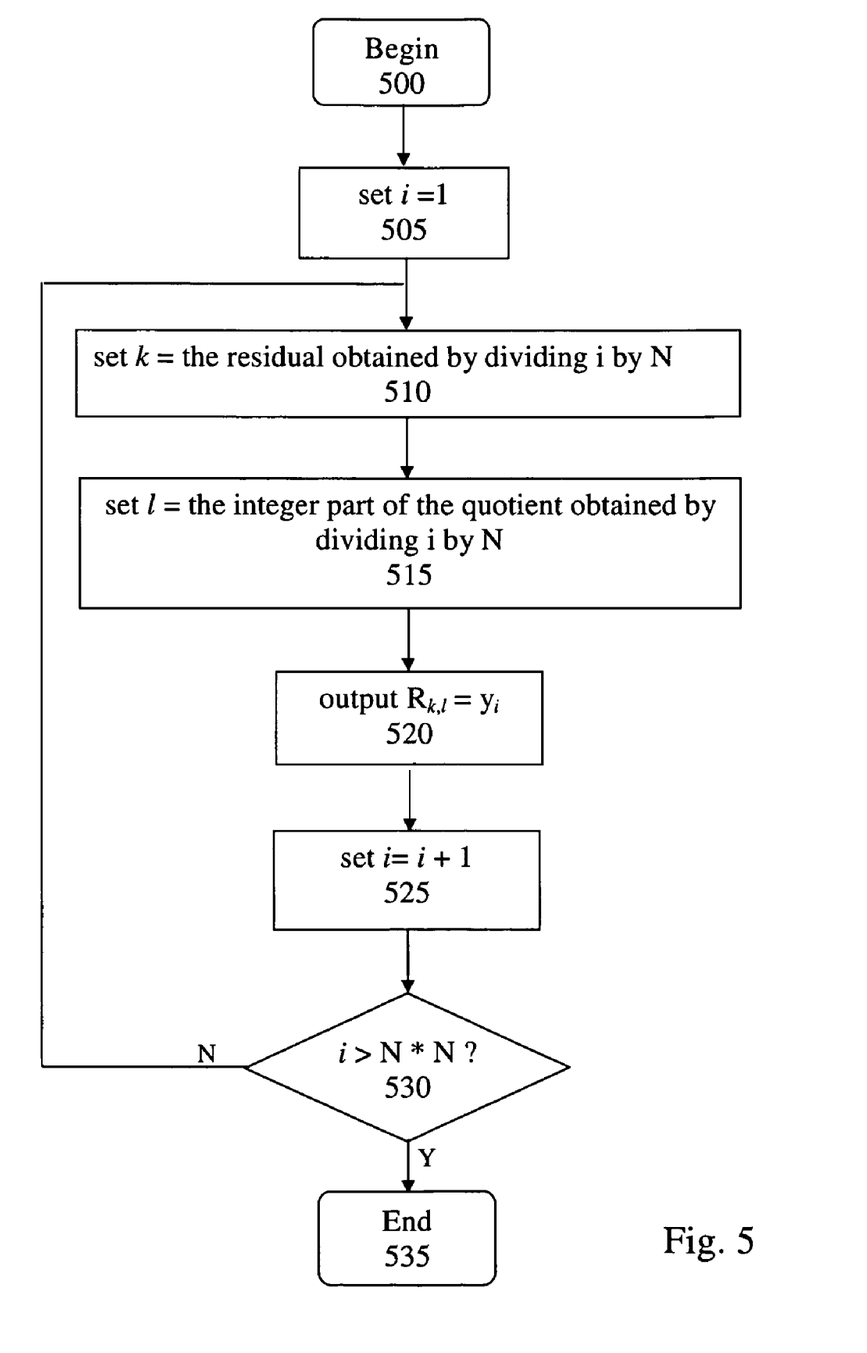
FIG. 5 is a flow diagram of the receiving matrix generator 2261 of FIG. 2 in generating an ICI matrix that represents the measured ICI of the OFDM system of FIG. 2.

FIG. 5 depicts the operational flow performed by the receiving matrix generator 2261 of FIG. 2. Specifically, the receiving matrix generator 2261 receives a output symbol stream from the P/S converter 222, which corresponds to the test symbol stream (i.e., test frame generated by the test symbol generator 216 of FIG. 2) and includes N*N symbols $\{y_1, y_2, \ldots, y_{N*N}\}$. Then the symbols in the output symbol stream are arranged in the same way as the test frame in the transmitter 210 of FIG. 2. According to the flow shown in FIG. 5, the following N*N matrix (herein referred to as a receiving matrix R) is obtained:

$$R = \begin{bmatrix} R_{11} & R_{12} & \cdots & R_{1(N-1)} & R_{1N} \\ R_{21} & R_{22} & \cdots & R_{2(N-1)} & R_{2N} \\ \vdots & \vdots & \ddots & \vdots & \vdots \\ R_{(N-1)1} & R_{(N-1)2} & \cdots & R_{(N-1)(N-1)} & R_{(N-1)N} \\ R_{N1} & R_{N2} & \cdots & R_{N(N-1)} & R_{NN} \end{bmatrix}$$

wherein $R_{k,l}$ (k≠l) is a symbol received on the kth sub-carrier when signals are only transmitted on the lth sub-carrier, and $R_{ll}$ is a symbol received on the lth sub-carrier when signals are only transmitted on the lth sub-carrier.

Among all the N sub-carriers transmitted at the same time, because there is only one sub-carrier that have signals thereon (see the test frame of FIG. 3), the signals received on the other sub-carriers are interfering signals imposed by the one sub-carrier on the other sub-carriers. Thus the receiving matrix R represents the ICI matrix C of the OFDM system 200. This means:

$$C = \begin{bmatrix} C_{11} & C_{12} & \cdots & C_{1(N-1)} & C_{1N} \\ C_{21} & C_{22} & \cdots & C_{2(N-1)} & C_{2N} \\ \vdots & \vdots & \ddots & \vdots & \vdots \\ C_{(N-1)1} & C_{(N-1)2} & \cdots & C_{(N-1)(N-1)} & C_{(N-1)N} \\ C_{N1} & C_{N2} & \cdots & C_{N(N-1)} & C_{NN} \end{bmatrix} = R$$

wherein $C_{k,l}$ (k≠l) represents the interference from the lth sub-carrier on the kth sub-carrier.

The ICI matrix C may be used in computing various performance parameters of the OFDM system. For example, it may be used in computing the average carrier-to-interference power ratio (CIR):

$$CIR_{MATRIX} = \frac{\sum_{l=1}^{N} |C_{l,l}|^2}{\sum_{l=1}^{N} \sum_{\substack{k=1 \\ l \neq k}}^{N} |C_{l,k}|^2}$$

The rate of the test symbol stream generated by the test symbol generator 216 may be determined as required. For example, it can be the bandwidth of the OFDM system under test. ICI matrices of the OFDM system operating with different bandwidth may be obtained by using test symbols of different rate.

Figure 6:
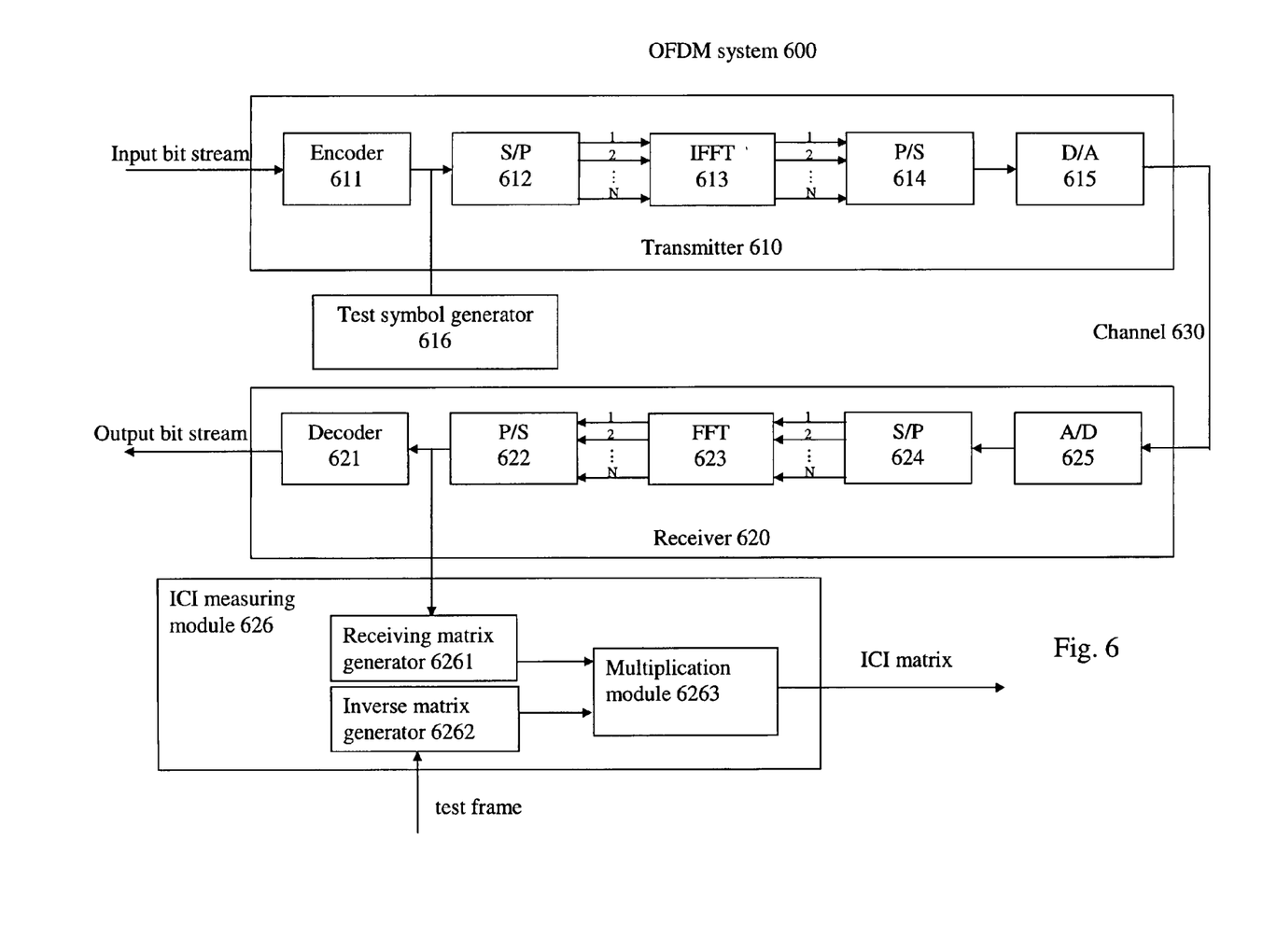
FIG. 6 is a block diagram depicting an OFDM system having an ICI measuring system according to another embodiment of the present invention, wherein the ICI measuring system includes a test symbol generator 616 and an ICI measuring module 626 that further includes a receiving matrix generator 6261, an inverse matrix generator 6262, and a multiplication module 6263.

Another embodiment of the present invention will now be described according to FIG. 6 of the present invention. FIG. 6 depicts an OFDM system 600 containing an ICI measuring system according to another embodiment of the present invention. The OFDM system 600 includes a transmitter 610, a receiver 620, and a channel 630. The transmitter 610 includes an encoder 611, an S/P converter 612, an IFFT module 613, a P/S converter 614, and a D/A converter 615. The receiver 620 includes a decoder 621, a P/S converter 622, an FFT module 623, an S/P converter 624, and an A/D converter 625.

In addition, the OFDM system 600 also includes an ICI measuring system having a test symbol generator 616 and an ICI measuring module 626. The ICI measuring module 626 includes a receiving matrix generator 6261, an inverse matrix generator 6262, and a multiplication module 6263. The test symbol generator 616 is connected to the input of the S/P converter 612. The ICI measuring module 626 is connected with the output of the P/S converter 622. The structure and function of each of the modules 611-615 and 621-625 are known and will not be described more detail below. The structure and function of the receiving matrix generator 6261 is the same as that of the receiving matrix generator 2261 of FIG. 2 and will not be described more detail below.

In the OFDM system 600, the test symbols generated by the test symbol generator 616 constitute an orthogonal matrix. In one embodiment, the orthogonal matrix may be a non-identity matrix (e.g., Hadamard matrix H). In such a case, the receiving matrix R output from the receiving matrix generator 6261 is not the ICI matrix. To obtain the ICI matrix in this case, the multiplication module 6263 needs to multiplex the receiving matrix R with an inverse matrix of the test frame ($H^{-1}$) generated in the inverse matrix generator 6262 to obtain the ICI matrix, that is, $C=H^{-1}*R$. Alternatively, the orthogonal matrix may be an identity matrix.

FIG. 7 depicts the non-identity matrix test symbol stream used for measuring the ICI information of the OFDM system 600. During the measurement, the test symbol generator 616 generates a test symbol stream consisting of N*N symbols $\{x_{11}, x_{21}, \ldots, x_{N1}, x_{12}, x_{22}, \ldots, x_{N2}, \ldots, x_{1N}, x_{2N}, \ldots, x_{NN}, N=8\}$, which can constitute a Hadamard matrix H. In this case, the rate of the test symbol stream may also be determined as required. It should be noted that N=8 is merely an example. A different number of the sub-carriers of the tested OFDM system 600 may correspond to a different value of N.

Figure 8:
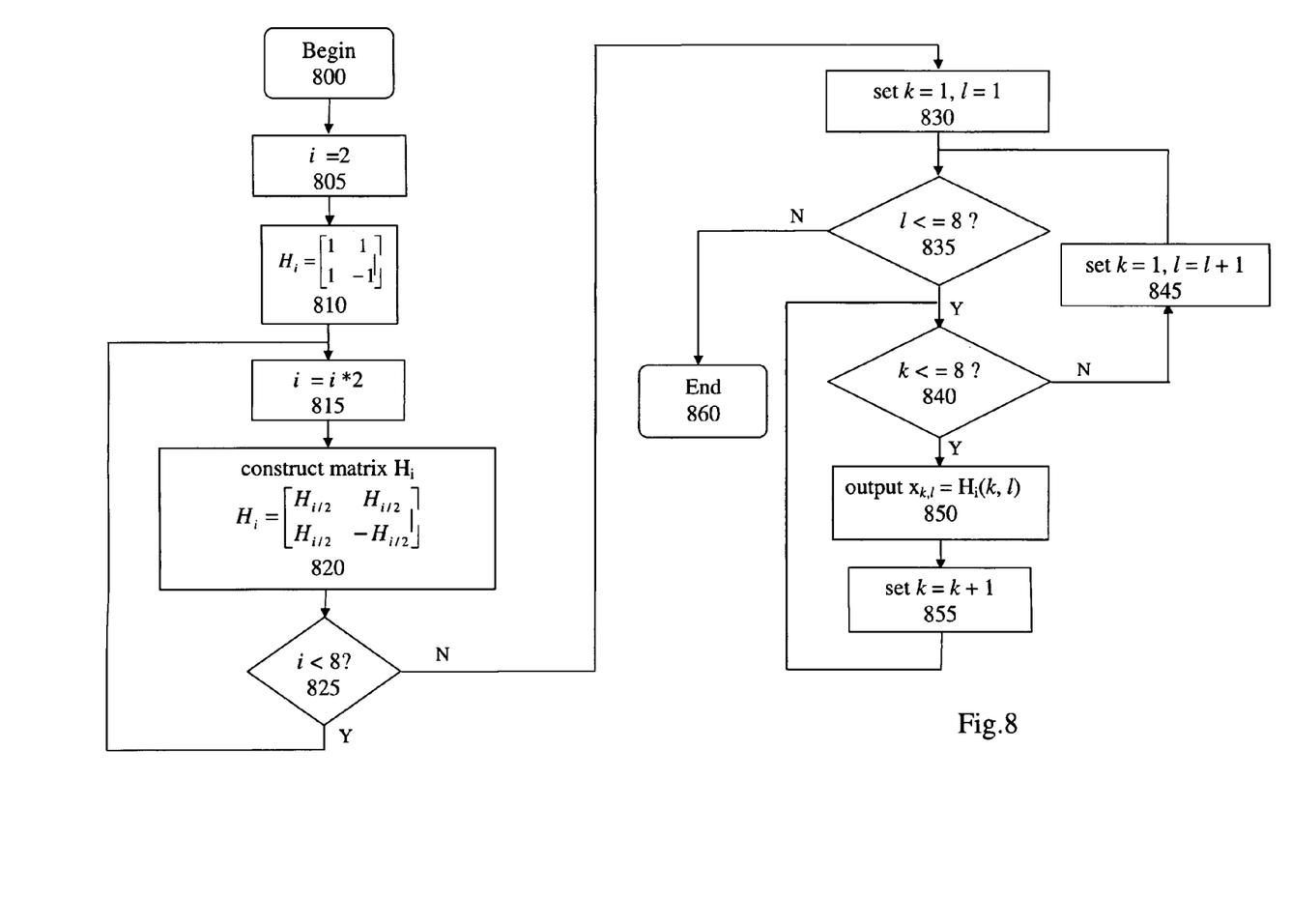
FIG. 8 depicts a flow diagram of the test symbol generator 616 of FIG. 6 in generating the test frame of FIG. 7.

FIG. 8 shows a flow used by the test symbol generator 616 to generate the test symbol stream of FIG. 7.

Since N*N symbols are used to setup the test frame, the time duration is large in fading channels due to the frequency selective characteristic. However, this method is quite applicable for transmitter test by simply adopting cable for direct link.

The test symbol generator 616, the receiving matrix generator 6261, the inverse matrix generator 6262, and the multiplication module 6263 (all shown in FIG. 6) may be implemented in hardware, software or any of their combinations.

Although the present invention has been described above in connection with the embodiments, the above descriptions are only illustrative rather than restrictive. It is to be understood by those skilled in the art that various modifications, combinations, sub-combinations and substitutions may be present according to design requirements and other factors as long as they fall within the scope of the appended claims or equivalents thereof.

What is claimed is:

1. A system for measuring inter-carrier interference (ICI) in an Orthogonal Frequency Division Multiplexing (OFDM) system, comprising:

a test symbol generator coupled to a transmitter of the OFDM system to generate an N*N orthogonal matrix having N*N test symbols, wherein the test symbols are sent by the transmitter to a receiver of the OFDM system, and the N*N orthogonal matrix is a Hadamard matrix; and an ICI measuring module coupled to the receiver to detect the N*N test symbols received in the receiver and to arrange the test symbols as a receiving matrix in the same way as the orthogonal matrix in the transmitter, and to output the receiving matrix as an ICI matrix of the OFDM system, wherein an element on the kth row, lth column of the ICI matrix represents interference from the lth sub-carrier on the kth sub-carrier, wherein $k \neq l$, wherein the ICI measuring module comprises:

an inverse matrix generator to generate an inverse matrix of the orthogonal matrix; and a multiplication module to multiplexes the inverse of the orthogonal matrix with the receiving matrix to output the ICI matrix of the OFDM system.

2. The system according to claim 1, wherein the rate of the test symbol stream is the bandwidth of the OFDM system.

3. A system for measuring inter-carrier interference (ICI) in an Orthogonal Frequency Division Multiplexing (OFDM) system, comprising:

a test symbol generator coupled to a transmitter of the OFDM system to generate an N*N orthogonal matrix having N*N test symbols, wherein the orthogonal matrix is an identity matrix and the test symbols are sent in a test symbol stream by the transmitter to a receiver of the OFDM system, causing ICI signals of the OFDM system to be embedded in the test symbol stream as orthogonal vectors of the orthogonal matrix; and an ICI measuring module coupled to the receiver to detect the N*N test symbols received in the receiver, to arrange the test symbols as a receiving matrix in the same way as the orthogonal matrix in the transmitter, and to output the receiving matrix as an ICI matrix of the OFDM system, wherein an element on the kth row, lth column of the ICI matrix directly reflects an ICI signal imposed by the lth sub-carrier on the kth sub-carrier, wherein $k \neq l$.

4. The system of claim 3, wherein the rate of the test symbol stream is the bandwidth of the OFDM system.

5. A method for measuring inter-carrier interference (ICI) in an OFDM system, comprising:

generating an N*N orthogonal matrix having N*N test symbols, wherein the orthogonal matrix is an identity matrix;

sending the test symbols in a test symbol stream from a transmitter of the OFDM system to a receiver of the OFDM system, causing ICI signals of the OFDM system to be embedded in the test symbol stream as orthogonal vectors of the orthogonal matrix; an detecting the N*N test symbols received in the receiver and arranging the test symbols as a receiving matrix in the same way as the orthogonal matrix in the transmitter, wherein an element on the kth row, lth column of the ICI matrix directly reflects an ICI signal imposed by the lth sub-carrier on the kth sub-carrier, wherein $k \neq l$; and outputting the receiving matrix as an ICI matrix of the OFDM system.

6. The method of claim 5, wherein the rate of the test symbol stream is the bandwidth of the OFDM system.

* * * * *